(12) United States Patent
Coombs

(10) Patent No.: US 11,458,794 B2
(45) Date of Patent: Oct. 4, 2022

(54) SYSTEM AND METHOD FOR LOAD MANAGEMENT

(71) Applicant: AKTV8 LLC, Wixom, MI (US)

(72) Inventor: Joshua Coombs, Wixom, MI (US)

(73) Assignee: AKTV8 LLC, Brighton, MI (US)

( * ) Notice: Subject to any disclaimer, the term of this patent is extended or adjusted under 35 U.S.C. 154(b) by 0 days.

(21) Appl. No.: 17/170,857

(22) Filed: Feb. 8, 2021

(65) Prior Publication Data
US 2021/0178846 A1 Jun. 17, 2021

Related U.S. Application Data

(62) Division of application No. 15/862,405, filed on Jan. 4, 2018, now abandoned.
(Continued)

(51) Int. Cl.
*B60G 17/015* (2006.01)
*B60G 17/0165* (2006.01)
(Continued)

(52) U.S. Cl.
CPC ....... *B60G 17/0152* (2013.01); *B60G 17/017* (2013.01); *B60G 17/0165* (2013.01);
(Continued)

(58) Field of Classification Search
CPC .......... B60G 17/0152; B60G 17/0155; B60G 17/016; B60G 17/0162; B60G 17/0165; B60G 17/017; B60G 17/04; B60G 17/0416; B60G 17/052; B60G 17/0523; B60G 17/0525; B60G 17/0526; B60G 17/0528; B60G 17/056; B60G 17/0565; B60G 2202/15; B60G 2202/152; B60G 2300/02;
(Continued)

(56) References Cited

U.S. PATENT DOCUMENTS 4,722,546 A * 2/1988 Asami ................ B60G 17/0165
280/5.517
4,744,239 A * 5/1988 Kyrtsos ................. G01M 17/04
73/11.07
(Continued)

FOREIGN PATENT DOCUMENTS

JP         02144210 A * 6/1990 ......... B60G 17/0182

*Primary Examiner* — Laura Freedman
(74) *Attorney, Agent, or Firm* — William H. Honaker; Dickinson Wright PLLC

(57) ABSTRACT

A method for analyzing and managing a vehicle load carried by a vehicle, the vehicle having a fluid suspension system, the method including sampling, at a manifold of the fluid suspension system, a set of fluid pressure corresponding to a set of fluid springs of the fluid suspension system, wherein the set of fluid springs supports the vehicle load; determining an existing stiffness distribution, the existing stiffness distribution including a stiffness value associated with each of the set of fluid springs; determining a contextual dataset during vehicle operation; determining a desired stiffness distribution based on the contextual dataset; automatically controlling the set of fluid springs at the plurality of actuation points based on the desired stiffness distribution, wherein controlling the set of fluid springs includes setting the stiffness value of the fluid spring associated with each of the plurality of actuation points.

10 Claims, 7 Drawing Sheets

Related U.S. Application Data

(60) Provisional application No. 62/564,953, filed on Sep. 28, 2017, provisional application No. 62/442,119, filed on Jan. 4, 2017.

(51) Int. Cl.
  *B60G 17/04* (2006.01)
  *B60G 17/017* (2006.01)

(52) U.S. Cl.
  CPC ...... *B60G 17/0416* (2013.01); *B60G 2202/15* (2013.01); *B60G 2400/60* (2013.01); *B60G 2400/61* (2013.01); *B60G 2500/203* (2013.01); *B60G 2800/019* (2013.01); *B60G 2800/915* (2013.01)

(58) Field of Classification Search
  CPC ...... B60G 2300/026; B60G 2300/0262; B60G 2300/042; B60G 2400/51; B60G 2400/512; B60G 2400/5122; B60G 2400/51222; B60G 2400/52; B60G 2400/60; B60G 2400/61; B60G 2400/82; B60G 2400/824; B60G 2500/203; B60G 2500/204; B60G 2500/22; B60G 2800/019; B60G 2800/915; B60G 11/26; B60G 11/27; B60G 2204/47; B60G 2204/4702; G01G 19/10; B62D 61/12; B62D 61/125

See application file for complete search history.

(56) References Cited

U.S. PATENT DOCUMENTS

| | | | | |
|---|---|---|---|---|
| 4,937,748 | A  * | 6/1990 | Yonekawa | B60G 17/0162 280/5.508 |
| 5,215,327 | A  * | 6/1993 | Gatter | B60G 11/32 267/225 |
| 7,197,384 | B2 * | 3/2007 | Schweickhardt | B60G 17/0152 701/37 |
| 7,637,513 | B2 * | 12/2009 | Kotulla | B60G 21/06 280/124.106 |
| 9,045,017 | B2 * | 6/2015 | Buettner | B60G 17/0161 |
| 9,168,807 | B2 * | 10/2015 | Lloyd | B60G 17/0523 |
| 2017/0361672 | A1 * | 12/2017 | Ahmadian | B60G 17/033 |

* cited by examiner

SYSTEM AND METHOD FOR LOAD MANAGEMENT

CROSS-REFERENCE TO RELATED APPLICATIONS

This application is a division of application Ser. No. 15/862,405 filed on 4 Jan. 2018, which claims the benefit of U.S. Provisional Application No. 62/442,119 filed 4 Jan. 2017, and U.S. Provisional Application No. 62/564,953 filed 28 Sep. 2017, which are each incorporated in their entirety by this reference.

TECHNICAL FIELD

This invention relates generally to the vehicle load management field, and more specifically to a new and useful system and method for analysis and control of vehicle pressure systems in the vehicle load management field.

BACKGROUND

Often, negative outcomes involving vehicles that carry loads are the result of improperly arranged and/or distributed loads within the vehicles. Such outcomes can include crashes (e.g., jack-knifing), poor handling and maneuverability, sub-optimal fuel and/or time efficiency, and other undesirable vehicular operating conditions.

Thus, there is a need in the vehicle load management field for a new and useful system and/or method to address such issues as those described above, and other related load management issues. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
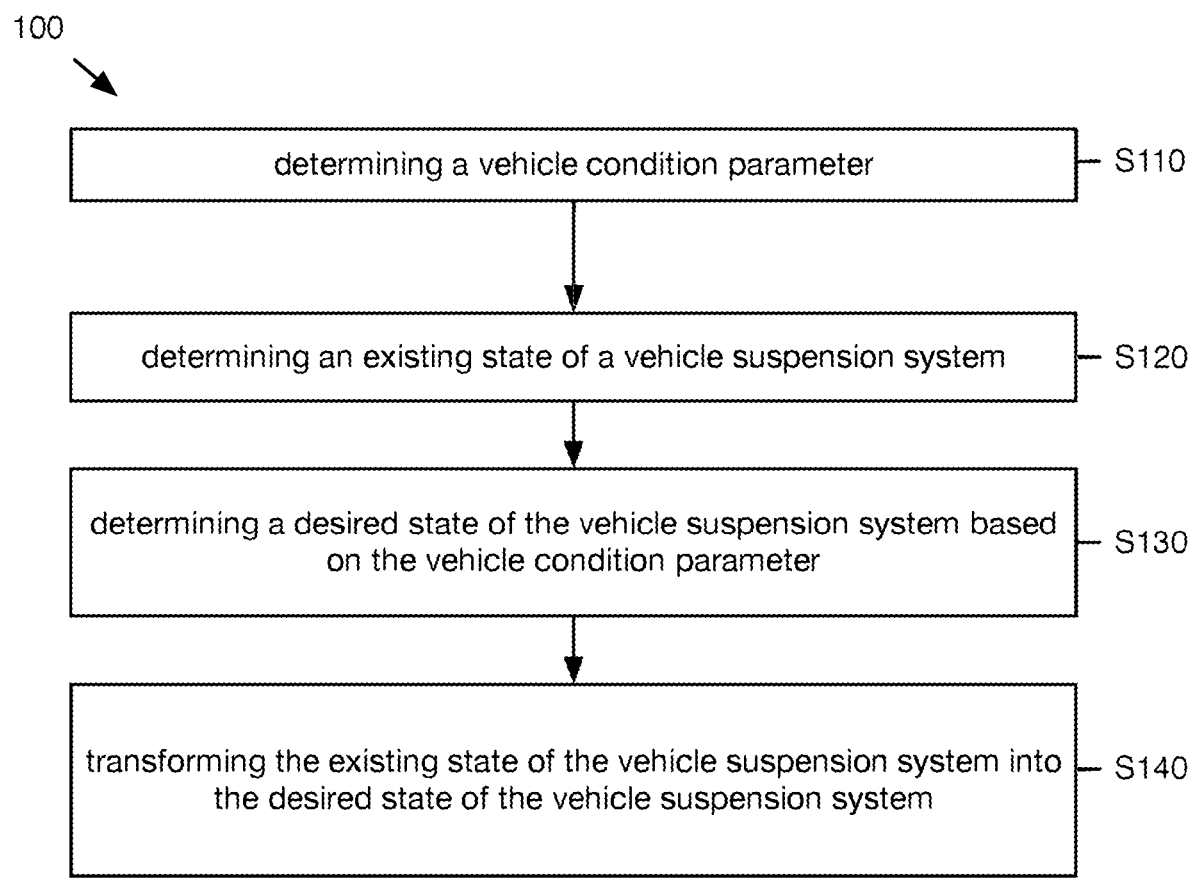
FIG. 1 is a flowchart depiction of a variation of the method.

As shown in FIG. 1, the method 100 for vehicle load management includes: determining a vehicle condition parameter S110; determining an existing state of a vehicle suspension system S120; determining a desired state of the vehicle suspension system based on the vehicle condition parameter S130; and transforming the existing state of the vehicle suspension system into the desired state of the vehicle suspension system S140. The method 100 functions to manage the load carried by the vehicle (e.g., the vehicle load), and can include manipulating (e.g., actuating) the suspension system of the vehicle and/or instructing a vehicle operator to arrange the vehicle load such that the vehicle suspension system is transformed into the desired state. The method 100 can also function to actively control the attitude (e.g., roll angle, pitch angle, etc.) of the vehicle by controlling the stiffness and/or ride height of the suspension system. The method 100 can also function to determine a dynamical model of vehicle operation based on the vehicle load characteristics. The method 100 can additionally or alternatively have any other suitable vehicle load management function.

Figure 2:
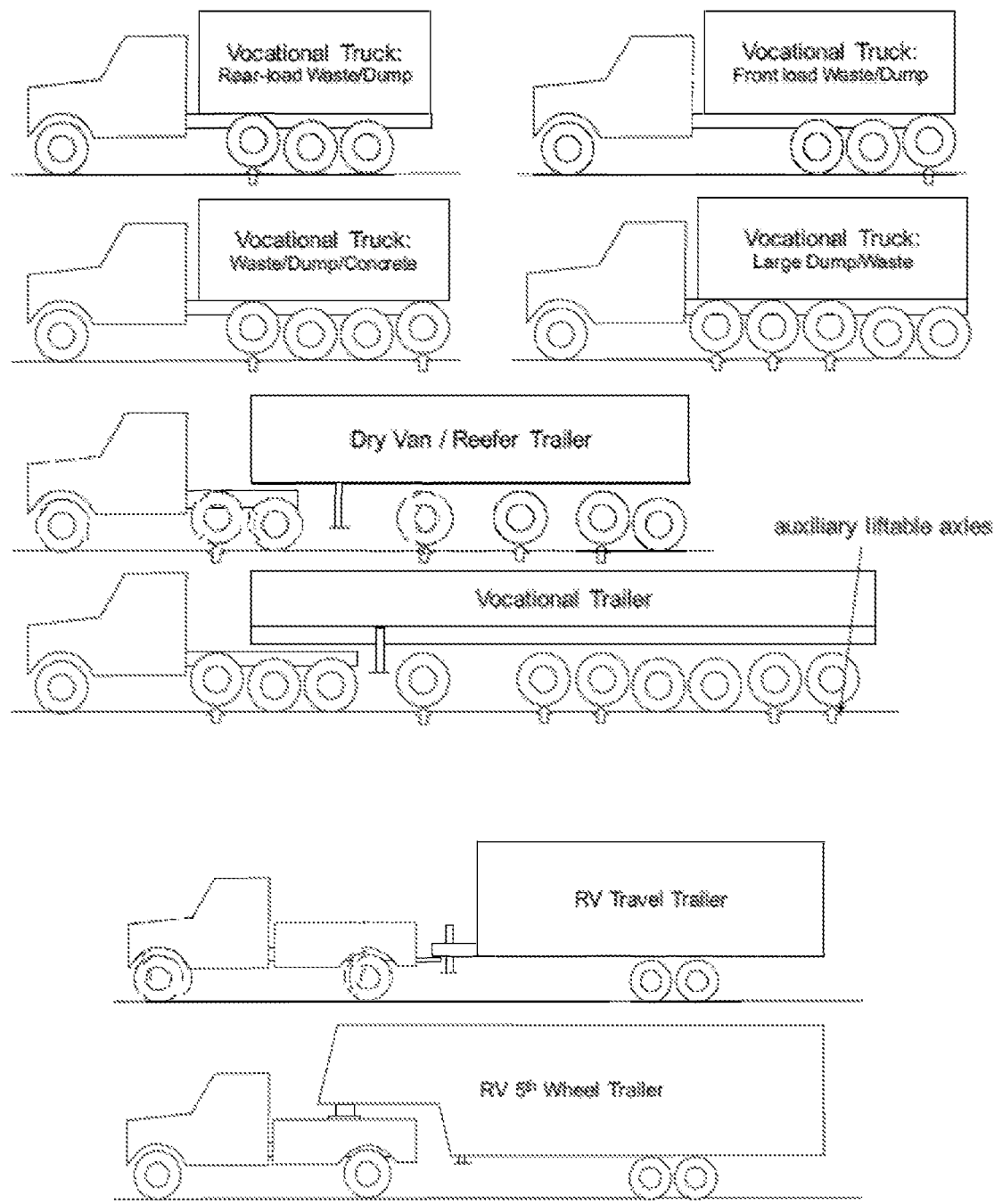
FIG. 2 is a side view of various example vehicle types and configurations at which variants of the method can be implemented.

The method 100 is preferably implemented in the context of a vehicle configured to transport cargo in a cargo compartment. As shown in FIG. 2, the vehicle can be a commercial truck (e.g., tractor trailer, hauler, rig, truck, vocational truck, rear-load, front-load, dry van/reefer trailer, vocational trailer, etc.), a recreational vehicle (e.g., camper van, motorhome, trailer, caravan, RV travel trailer, RV $5^{th}$ wheel trailer, etc.), an oversized truck, and any other suitable vehicle, and can include any suitable number and configuration of auxiliary liftable axles (e.g., lift axles, drop axles, etc.). In alternative implementations of the method 100, the vehicle can be a consumer vehicle (e.g., a sedan, a minivan, a station wagon, etc.). In cases wherein the vehicle is a tractor trailer, the cargo compartment is preferably the trailer. In cases wherein the vehicle is a recreational vehicle, the cargo compartment is preferably the interior of the vehicle. However, the cargo compartment can additionally or alternatively be any suitable interior portion of any suitable vehicle.

Figure 3:
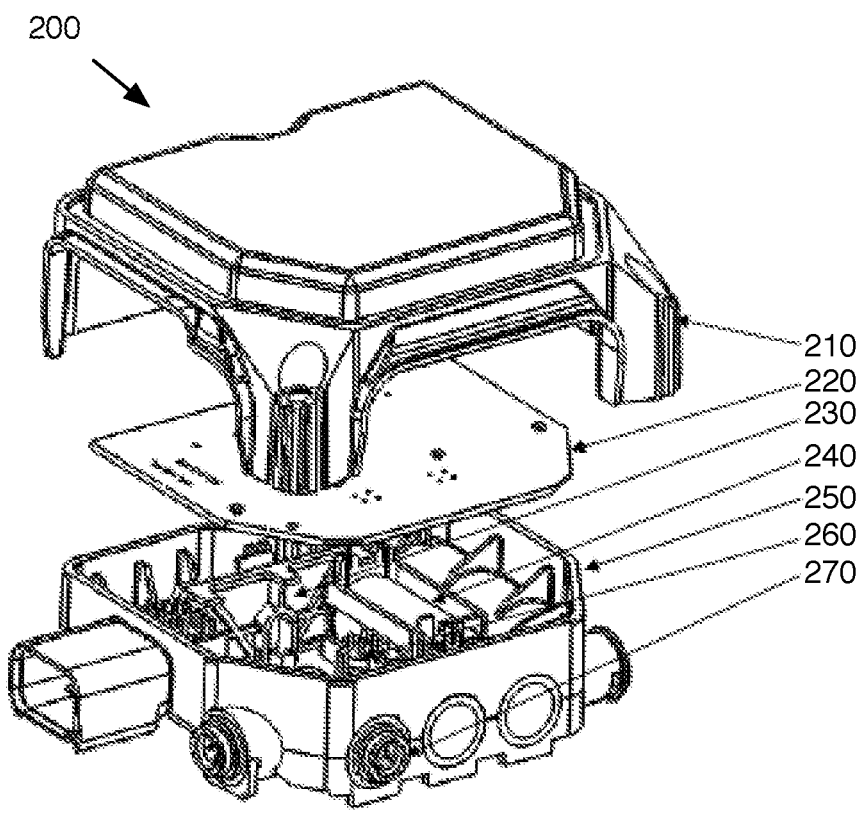
FIG. 3 is an exploded view of an example of the system.

The method 100 is preferably implemented, at least in part, using a system including an electronic control unit (ECU) 200 configured to control a fluid-based suspension system (e.g., a fluid suspension system, an air suspension system, a pneumatic system, etc.). The suspension system can include a primary suspension system (e.g., the suspension system corresponding to the drive axle or axles and primary driven axles) and a secondary suspension system (e.g., a lift axle suspension system, auxiliary suspension system, etc.). As shown in FIG. 3, the ECU 200 preferably includes an enclosure 210, a printed circuit board assembly (PCBA) 220, a valve retainer 230, a valve 240, a manifold 250, a pressure sensor 260, and a fitting 270. The system 200 preferably integrates valves, sensors, and the PCBA into a sealed module that functions control any device driven by fluid pressure (e.g., according to variants and/or portions of the method 200). The ECU 200 can also function to monitor supply pressure (e.g., from a compressor of the vehicle), and can restrict system operation to cases when the supply pressure is above a threshold value (e.g., an airbrake pressure protection threshold). The ECU 200 can also function to open valves to inflate or deflate points of control (e.g., air springs, load bag, lift bag, etc.), using any suitable method (e.g., using pulse width modulation to modulate flow to and from actuation points). The ECU 200 can also function to utilize secondary valves (e.g., driven by the primary valves) to increase system response speeds (e.g., wherein the secondary valves have higher flow rates than the primary valve). The ECU 200 can also function to monitor and report leak rates (e.g., via the CAN bus, via an alternative communication protocol such as Bluetooth, radio, etc.) from portions of the fluid suspension system. The ECU 200 can also function to connect to a remote device (e.g., via Bluetooth) to transmit system information and receive user input (e.g., control instructions). The ECU 200 can also function to connect to the vehicle computing architecture (e.g., CAN bus) and utilize data (e.g., contextual data) collected therefrom (e.g., vehicle speed, ABS active alert, steering wheel angle, geographic location, etc.) to implement portion(s) of the method 100. The ECU 200 can also function to monitor an on-board (e.g., integrated with the ECU) tri-axis accelerometer (or other inertial measurement unit) to determine vehicle attitude (e.g., ride height, ride angles, etc.) and/or vibration characteristics during vehicle operation (e.g., excessive vibration due to unbalanced and/or out-of-round tire, etc.). The ECU 200 can also function to monitor additional vehicle sensor outputs (e.g., brake pad wear sensors) and report the outputs to the vehicle computing architecture (e.g., transmit the output data to the CAN bus). The ECU 200 can additionally or alternatively have any suitable function.

In variations, the system 200 includes components substantially as described in U.S. application Ser. No. 15/712,995, filed 22 Sep. 2017, and which is incorporated herein in its entirety by this reference. However, the method 100 can additionally or alternatively be implemented in conjunction with a system including any other suitable electronic control unit.

In some variations, the method 100 can include control of tire pressure using the system 200, which can be configured and utilized substantially as described in U.S. application Ser. No. 15/805,015, filed 6 Nov. 2017, and which is incorporated herein in its entirety by this reference. However, in alternative variations, the method 100 can otherwise suitably control tire pressure and/or omit tire pressure control.

In some variations, the method 100 can include the use of a location (e.g., location data). A location can be a set of geographic coordinates (e.g., latitude and longitude), a place name (e.g., county, city, landmark, intersection, etc.), a physical street address, distance from a given location, presence within a specified radius from a given location, a graphical depiction on a map, or any other suitable location expression. Geolocation can involve geocoding to find associated latitude and longitude from other geographic data. Geolocation can additionally or alternatively involve reverse geocoding to back code latitude and longitude coordinates to a readable address or place name. The location can be determined based on GPS coordinates provided by a device, triangulation between mobile phone towers and public masts (e.g., assistive GPS), Wi-Fi connection location, WHOIS performed on IP address or MAC address, GSM/CDMA cell IDs, location information self-reported by a user, or determined in any other suitable manner. The location system can be a GPS system, cellular tower triangulation system, trilateration system, beacon system, or be any other suitable location system.

Figure 5:
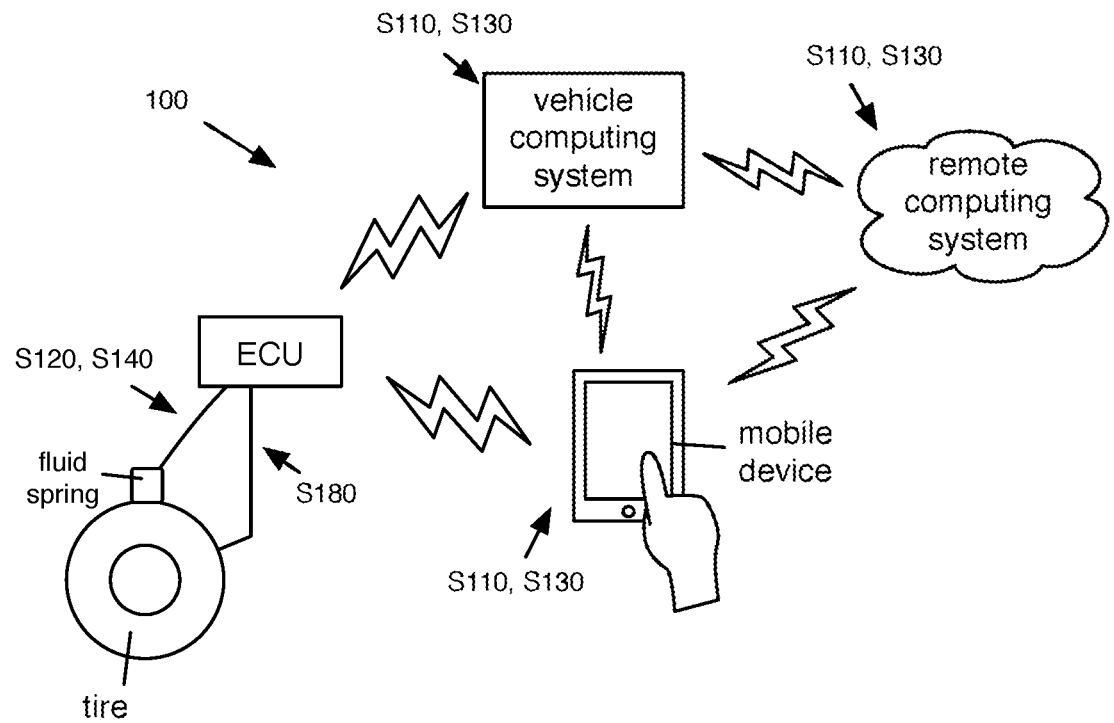
FIG. 5 is an illustration of example computing system components at which variants of the method can be implemented.

As shown in FIG. 5, the method 100 can, in variations, be implemented in conjunction with a mobile device, a remote computing system, and a vehicle computing system in addition to the ECU. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component Outputs can include: displays (e.g., LED display, OLED display, LCD, etc.), audio speakers, lights (e.g., LEDs), tactile outputs (e.g., a tixel system, vibratory motors, etc.), or any other suitable output.

Inputs can include: touchscreens (e.g., capacitive, resistive, etc.), a mouse, a keyboard, a motion sensor, a microphone, a biometric input, a camera, or any other suitable input.

The communication system can include one or more radios or any other suitable component. The communication system can be a long-range communication system, a short-range communication system, or any other suitable communication system. The communication system can facilitate wired and/or wireless communication. Examples of the communication system include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof.

Sensors of the system, device, and/or vehicle can include: cameras (e.g., visual range, multispectral, hyperspectral, IR, stereoscopic, etc.), orientation sensors (e.g., accelerometers, gyroscopes, altimeters), acoustic sensors (e.g., microphones), optical sensors (e.g., photodiodes, etc.), temperature sensors, pressure sensors, flow sensors, vibration sensors, proximity sensors, chemical sensors, electromagnetic sensors, force sensors, or any other suitable type of sensor.

The power supply is preferably a self-contained battery, but can additionally or alternatively include a wired connection to a vehicle battery, wireless connection (e.g., inductive charger, RFID charging, etc.), a battery (e.g., secondary or rechargeable battery, primary battery, etc.), energy harvesting system (e.g., solar cells, piezoelectric systems, pyroelectrics, thermoelectrics, etc.), or any other suitable system.

The location system can include a GPS unit, a GNSS unit, a triangulation unit that triangulates the device location between mobile phone towers and public masts (e.g., assistive GPS), a Wi-Fi connection location unit, a WHOIS unit (e.g., performed on IP address or MAC address), a GSM/CDMA cell identifier, a self-reporting location information, or any other suitable location module.

The method is preferably performed in whole or in part by the ECU of the system 200, but can alternatively be performed by a native application on a user device, a server, by a browser application on a user device, or by any other suitable apparatus. The user device is preferably a mobile device associated with the user, including mobile phones, laptops, smartphones, tablets, or any other suitable mobile device. The user device is preferably connected to the server, wherein the connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device can additionally or alternatively function as the server, such as in a distributed network system. The method can be performed by one or more servers, wherein the servers can be stateless, stateful, or have any other suitable configuration or property.

Blocks of the method 100 can, in variations, be implemented as a plurality of modules and/or portions thereof, wherein the plurality of modules are implemented at a computing system (e.g., an ECU, a mobile device, an alternative computing system associated with the vehicle, etc.). Each module of the plurality can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module can additionally or alternatively be a: probabilistic module, heuristic module, deterministic module, or be any other suitable module leveraging any other suitable computation method, machine learning method, or combination thereof.

Each module can be validated, verified, reinforced, calibrated, or otherwise updated based on newly received, up-to-date measurements; past measurements recorded during the operating session; historic measurements recorded during past operating sessions; or be updated based on any other suitable data. Each module can be run or updated: once; at a predetermined frequency; every time the method is performed; every time an unanticipated measurement value is received; or at any other suitable frequency. The set of modules can be run or updated concurrently with one or more other modules, serially, at varying frequencies, or at any other suitable time. Each module can be validated, verified, reinforced, calibrated, or otherwise updated based on newly received, up-to-date data; past data or be updated based on any other suitable data. Each module can be run or updated: in response to determination of an actual result differing from an expected result; or at any other suitable frequency.

2. Benefits

The inventors have discovered that conventional suspension systems suffer from several drawbacks. First, pressure regulators are oftentimes set to fully-loaded pressure, and not optimized for partial load. Second, when the vehicle includes lift axles, lift axle actuation (e.g., lifting, deployment) is often manually performed, which relies on the driver to remember to deploy and/or lift the axle. Third, because lift axle actuation is manual, lift axle deployment and/or lifting can be inconsistent between drivers, and lift axle deployment and/or lifting can require drivers to dynamically interpret and respond to road, route, and/or load conditions that suggest lift axle deployment and/or lifting (e.g., performing a turn). Fourth, conventional pneumatic height control systems are designed with response delays to reduce air consumption and improve fuel economy—this delayed control response slows the vehicles ability to fully lift axles. Fifth, some vehicles lack adjustable suspension altogether, and therefore suffer from asymmetric axle loading.

Variations of the method 100 and/or system 200 can afford several benefits and/or advantages.

First, variants of the system enable automated suspension adjustment and/or lift axle deployment, resulting in increased regulatory compliance, gas consumption optimization, and vehicle performance. Second, variants of this system and method enables a facile way for users (e.g., first-time users, novice users, etc.) to compliantly load their vehicles by instructing the users on how to adjust the load within the vehicle (e.g., arrange the load) in real- or near-real time and/or by dynamically adjusting the vehicle support structure (e.g., tires, suspension, tongue jack, etc.) to accommodate the load imbalance. However, the system and method can confer any suitable set of benefits.

In a first example, the method can enable a lay-driver (e.g., a non-professional driver) of a hauling vehicle (e.g., a vehicle used for moving cargo such as a tractor-trailer, a recreational vehicle, a central-axle towed trailer and towing vehicle, etc.) to avoid improper load arrangement by measuring the load arrangement during and after vehicle loading and providing instructions to the lay-driver including how to achieve the proper load arrangement.

In a second example, the method can enable a commercial truck driver to maximize the efficiency of the distribution of the vehicle load during loading. For example, the method can include providing real-time updates of the load weight borne by each axle to the driver during loading, such that limitations regarding total weight and per-axle weight along the truck driver's planned route are adhered to. In another example, the method can include maintaining the trailer in a level configuration during loading of discrete load units (e.g., pallets) by automatically actuating the air suspension system in response to dynamically-changing load distribution within the cargo compartment, which can prevent discrete load units from sliding, rolling, or otherwise moving within the cargo compartment during loading.

Second, variants of the system and method can: enable better driver focus, maximize load on drive axles for improved traction, reduce tire wear, improve fuel economy, diagnose and/or anticipate maintenance or configuration, and improve regulatory compliance (e.g., bridge law compliance across one or more geographic regions), all by way of automating lift-axle deployment and/or otherwise controlling the fluid suspension system of the vehicle.

Third, variants of the system and method can enable the performance quality characteristics (e.g., health, wear, etc.) of system components (e.g., tires, fluid springs, fluid jacks, etc.) to be monitored and reported to a user or other entity associated with the vehicle. These characteristics can enable the vehicle and/or components to be serviced (e.g., repaired, replaced) prior to failures or other undesirable component performance degradation. For example, variants of the system and method can: sense temperature (e.g., internal temperature, fluid temperature, housing temperature) of components to determine a history of thermal cycling associated with the components; sense vertical acceleration and pressure fluctuation and determine rough and/or smooth road operation history; sense pressure in suspension elements (e.g., springs, tires) to determine load variation over time; and use the aforementioned characteristics (e.g., in combination with data from component manufacturers) to estimate the remaining life of the components (e.g., tires, air springs, dampers, bushings, etc.) and report the remaining component life to a user or other entity responsible for vehicle system maintenance.

However, variations of the method and/or system can additionally or alternatively afford any other suitable advantages and/or benefits.

In a specific example, a truck having a controllable air suspension system can follow a route defined by a series of map coordinates (e.g., determined by a GPS). The computing system controlling the air suspension system determines (e.g., via the map coordinates) that the truck has arrived at and/or will imminently arrive at an intersection, and that the truck will need to execute a turn (e.g., a turn through a subtended angle greater than a threshold angle, a turn of a sharpness exceeding a threshold sharpness, any other turn, etc.) that may require lifting of the lift axle(s). The method can include automatically lifting the lift axles in preparation for the turn. In a related specific example, the method can include determining that the truck is arriving at a loading/unloading depot or other destination at which maneuvering for trailer/load drop-off will likely be performed, and automatically lifting the lift axle(s) in preparation for maneuvering, and/or automatically adjusting the vehicle ride height (e.g., using load data gathered from air springs and/or jacks to inform the operator how to optimize the distribution of the existing or future vehicle load).

In another specific example, the method can include automatically changing ride height in response to terrain data associated with a planned route in real- or near-real time. It can be desirable for trucks (e.g., autonomous and/or platooning trucks) to travel at the lowest possible ride height for maximum aerodynamic efficiency, while simultaneously allowing adequate suspension travel to not bottom out over rough and/or highly variable terrain. The method can include determining terrain roughness (e.g., based on known terrain features along the vehicle route), and automatically increasing ride height in regions of the planned route including rough terrain. In a related example including a plurality of trucks arranged in a platoon, the lead truck experiences (e.g., detects) features of the terrain first, and the method can thus include communicating the terrain features to following vehicles in the platoon, and automatically adjusting ride height(s) of following vehicles accordingly. In this example, the method can also include providing terrain data to autonomous route and platoon controllers (e.g., teleoperators, remote servers, etc.), and gathering the terrain data using sensors of the air suspension system (e.g., ride height, pressure, and/or accelerometer sensors). The method can also include providing the terrain data to navigation products (e.g., Waze, Google Maps, etc.) to allow roadway users to be informed of terrain features along users' routes, and, in cases wherein the users' vehicles include controllable suspension systems, automatically adjusting the users' vehicle ride height(s) to avoid obstacles or otherwise suitably adapt the suspension to terrain features.

In another specific example, the method can include automatically optimizing lift axle deployment and suspension height based on real-time conditions during driving (e.g., terrain conditions, weather conditions, etc.). Based on the planned route (e.g., retrieved from a database, determined from the onboard GPS-enabled computing system, etc.), in combination with weather data along the planned route (e.g., retrieved from a weather forecast database, measured using onboard weather sensors, etc.), the method can include optimizing (e.g., by actuating the air suspension system) vehicle height and/or loading on the lift axles and drive axles. In a specific implementation, the weather data can include an indication of icy conditions, and the method can include increasing the percentage of the load borne by the driven axle (e.g., by increasing the stiffness of the suspension supporting the driven axle relative to the stiffness of the suspension supporting the non-driven axle) to enhance traction at the tires of the driven axle. In another specific implementation, the weather data can include an indication of snowy conditions, and the method can include equalizing load across all axles (e.g., driven and non-driven axles) to improve vehicle stability in high-speed (e.g., a range of highway speeds in the United States, 45-75 m.p.h., any suitable speeds, etc.) and snowy conditions. In related specific implementations, the method can include actively adjusting the relative stiffness of the air suspension at each axle and/or fully- or partially-lifting liftable axles (e.g., lift axles) for any suitable purpose, such as: to improve fuel econ by transferring more load to lift axles having low rolling resistance tires, to improve suspension articulation over rough terrain by fully lifting the lift axles, etc.

In another specific example, the method can include monitoring the vehicle level (e.g., whether the vehicle is level relative to a gravity vector, the number of degrees out of level the base of the vehicle cargo compartment is, etc.) at an on-board level sensor (e.g., bubble level, digital level, accelerometer, suspension height sensors that measure the angular difference between the road plane and vehicle body plane, etc.). The direction of the net force on various portions of the load (e.g., load vectors) can shift in cases wherein the vehicle is not level, and thus the method (e.g., implemented at a control system) can include determining the vehicle level and reporting the load vector(s) to a user and/or dynamically controlling the suspension system based on the load vector(s) (e.g., in order to adjust the load vectors, maintain the load vectors, etc.).

In some configurations, trailers can be loaded when disconnected from a tow vehicle (e.g., a tractor, a pickup truck, etc.) and it can still be desirable to monitor the load distribution and inform operators of optimal load distribution and recommended steps to achieve optimal load distribution. In such configurations, the method can include monitoring and control of trailer support(s) (e.g., landing gear, tongue jack, etc.) that are driven by compressed fluid (e.g., a pneumatic air spring). Such support(s) can be considered part of the vehicle suspension (e.g., the air suspension system of the vehicle).

3. Method

As described above, the method 100 for vehicle load management includes: determining a vehicle condition parameter S110; determining an existing state of a vehicle suspension system S120; determining a desired state of the vehicle suspension system based on the vehicle condition parameter S130; and transforming the existing state of the vehicle suspension system into the desired state of the vehicle suspension system S140. All or portions of the method are preferably performed by the ECU, but can alternatively be performed by the vehicle, a user device (e.g., smartphone), a remote computing system (e.g., server system), or by any other suitable system. The method can be performed upon trigger event detection (e.g., detecting door unlatching, vehicle power-on, vehicle motion, suspension loading or unloading, manual selection of a button or icon, or any other suitable trigger event), periodically, before, during, and/or after vehicle loading, or at any suitable time.

Load arrangements preferably describe (e.g., include data indicative of) the mass (weight) of the load as a function of the position within the cargo compartment of a vehicle, and can describe the function at any suitable resolution (e.g., a continuous function of position, a discretized function of position corresponding to the position of each suspension element, a binary function divided into 'fore' and 'aft' positions, a coordinate mapping of load portions to load positions, etc.).

Block S110 includes: determining a vehicle condition parameter, which functions to determine data pertaining to the condition of the vehicle that is germane to vehicle load management, for use as input(s) to subsequent block(s) of the method 100. The vehicle condition parameter can include: the total weight of the load within the vehicle, the total weight of the load to be loaded into the vehicle (e.g., outside the vehicle), the arrangement of the load within the vehicle (e.g., the weight as a function of position within a cargo compartment or other lumen of the vehicle), the suspension operating ranges (e.g., minimum and maximum pressures in each air spring, minimum and maximum travel of each suspension element, etc.), operating ranges of other components (e.g., minimum and maximum internal tire pressures, maximum load per axle), a planned route of the vehicle (e.g., the set of geographic locations that the vehicle will traverse between its origin and destination), a geographic location of the vehicle, traffic conditions (e.g., speed limits, actual traffic speed, roadway weight limits, roadway axle limits, etc.) associated with the vehicle's location and/or planned route, weather conditions (e.g., rain, sleet, snow, ice, wind, heat, etc.) associated with the vehicle location and/or planned route, terrain features (e.g., roadway banking angles, road surface quality, potholes, speedbumps, etc.) associated with the vehicle location and/or planned route, physical models of vehicle operation (e.g., dynamical models of the systemic response of the vehicle based on load distribution within the vehicle during vehicle operation and maneuvering), and any other suitable parameters. Vehicle condition parameters can additionally or alternatively include any suitable combination(s) of the aforementioned parameters. The vehicle condition parameter(s) can be a dataset, a single parameter value, a set of parameter values, or have any other suitable data structure. The vehicle condition parameters can be determined using: vehicle sensors (e.g., pressure sensors coupled to the internal fluid reservoirs of each element of a fluid suspension system, height sensors that detect the ride height of the vehicle, accelerometers, vibrometers, GPS sensors, etc.), user input mechanisms (e.g., a user interface, a touch screen communicatively coupled to the ECU, a mobile device associated with the user and communicatively coupled to the ECU, etc.), a remote computing system (e.g., a remote database from which vehicle condition parameters can be received at the vehicle), an onboard algorithm (e.g., executing at the ECU, executing at an alternative computing system of the vehicle, etc.), and by any other suitable mechanism.

In specific examples, Block S110 can include receiving the vehicle condition parameter at the ECU. In one example, the vehicle condition parameter includes data that correlates fluid spring pressure to load (e.g., a lookup table, a function relating pressure to load, etc.). In another example, the vehicle condition parameter includes a calibration dataset that includes the baseline pressures of various elements of the fluid suspension system when the vehicle is unloaded (e.g., for use in determining added load during loading). In another example, the vehicle condition parameter includes the number of axles of the vehicle. In another example, the vehicle condition parameter includes the vehicle identification number (VIN), and the method includes retrieving vehicle data (e.g., additional vehicle condition parameters) using the VIN (e.g., from a lookup table). However, Block S110 can include receiving and/or determining any other suitable intrinsic and/or extrinsic parameters associated with the vehicle.

Block S110 can include Block S111, which includes: determining a set of loading criteria. Block S111 functions to determine a set of criteria which should be met by the load distribution within the cargo compartment of the vehicle, for use in determining the desired state of the vehicle suspension system (e.g., Block S130). The loading criteria can be calculated, selected, retrieved, or otherwise determined. The loading criteria can be determined based on: the vehicle make and/or model, the driver, vehicle operation history (e.g., age, wear, etc.), the geographic route, the weather (e.g., current, predicted), wear component parameters (e.g., tire age, tread wear, etc.), suspension type, system pressure, or any other suitable parameter. The loading criteria can include: a weight distribution per axle, a weight limit per axle, the loading frequency, the loading order (e.g., back-to-front, left-to-right), or any other suitable loading criteria. The loading criteria can be determined by the ECU, retrieved from a remote computing system (e.g., directly, using a user device as an intermediary, etc.), or otherwise determined. In a first example, determining the set of loading criteria includes receiving weight-limit data associated with each axle of the vehicle (e.g., of a set of axles of the vehicle). In a related example, the set of loading criteria can be associated with a geographic location of the vehicle (e.g., loading criteria associated with a regulatory code in effect in the geographic location of the vehicle). In another related example, the set of loading criteria can be associated with a planned route of the vehicle (e.g., routes including a total weight limit, a weight-per-axle limit, etc.).

Figure 4:
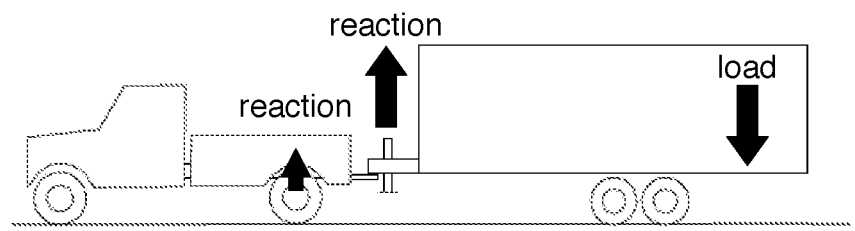
FIG. 4 is an illustration of reaction forces due to a possible overloaded configuration in a vehicle.

A variation of Block S111 includes determining a dynamical model of vehicle operation. The dynamical model is preferably based at least in part on characteristics of the vehicle load (e.g., load arrangement, total weight, etc.). The dynamical model is preferably a kinematic model, but can alternatively or additionally include: an optimization equation, a set of rules mapping a load weight at each position within a cargo compartment of the vehicle to a steering responsiveness or other vehicle operation characteristic, an operating envelope of the vehicle (e.g., the set of vehicle condition parameters in which the vehicle can operate in a desirable or controllable manner), and any other suitable physical model for vehicle operation. For example, the dynamical model of vehicle operation can be based on the arrangement of the vehicle load within the cargo compartment. The arrangement of the vehicle load can impact handling characteristics of the vehicle; for example, as shown in FIG. 4, a load oriented towards the rear of a trailer can lead to an upward force on the rear wheels of the towing vehicle and reduce traction and/or performance, particularly in cases wherein the rear wheels of the towing vehicle are drive wheels. The dynamical model can be determined (e.g., selected, calculated, learned, etc.) based on: the vehicle type, the driver or operator, the route (e.g., terrain, operations required along the route), the weather (e.g., current, predicted, historic, etc.), the weight of the load in the vehicle, the arrangement of the load in the vehicle, or otherwise determined. The dynamical model can output: a second load arrangement (e.g., preferred load arrangement, optimal load arrangement), a binary output (e.g., go/no-go) indicative of whether the vehicle can be desirably operated, guidance to the user for how to arrange the load to bring vehicle operating parameters into desirable ranges (e.g., related to steering responsiveness, braking responsiveness, jack-knifing avoidance, etc.), or any other suitable output. The dynamical model can be structured and/or implemented as: a neural network, an optimization equation, a discretized model, or any other suitable structure.

Block S110 can include Block S112, which includes: determining a contextual dataset. Block S112 functions to determine parameters related to the context of vehicle operation. The contextual dataset can include: any of the vehicle condition parameters described above, historical data related to the vehicle (e.g., maintenance records, performance history, etc.), data pertaining to the physical surroundings of the vehicle (e.g., positions of surrounding vehicles or roadway features relative to the vehicle, traffic characteristics in the region local to the vehicle, light levels surrounding the vehicle, proximity of pedestrians to the vehicle, etc.), and any other suitable data related to the context of the vehicle. Block S112 is preferably performed in substantially real-time, but can additionally or alternatively be performed asynchronously, based on an arbitrary delay, in response to a trigger, or at any other suitable time point or period. The contextual dataset can be determined by sensors onboard the vehicle (e.g., as described above), received from a user (e.g., as described above), and otherwise suitably determined. Block S112 is preferably performed during vehicle operation, which can include locomotion (e.g., driving of the vehicle), loading of the vehicle, and/or any other suitable vehicle state. The contextual dataset can be determined based on: a planned route of the vehicle, the location of the vehicle, the operation of the vehicle (e.g., dynamically changing handling characteristics of the vehicle, increasing or decreasing haptic or aural feedback to the user during vehicle operation, etc.), and any other suitable basis.

A variation of Block S112 includes: determining the contextual dataset based on a planned route of the vehicle and terrain features associated with the planned route. In this variation, the contextual dataset preferably includes an anticipated terrain feature (e.g., a banked roadway, a turn, etc.).

Block S120 includes: determining an existing state of the vehicle suspension system, which functions to establish the baseline status of the vehicle load distribution for use in determining transformation in subsequent Block(s) of the method 100. The state of the vehicle suspension system preferably includes the instantaneous force supplied by each suspension element (e.g., air spring, air jack, etc.) in the suspension system, and the mechanical work required to supply the force, such that the characteristics of the load supported by the suspension system can be determined based on the force and/or work. However, the state of the vehicle suspension system can additionally or alternatively include: data based on the aforementioned force(s) and/or work values, the load distribution among the suspension elements (e.g., air springs) of the suspension system, a binary indication of whether the vehicle is loaded or unloaded (e.g., whether a cargo load has been loaded into the vehicle, unloaded from the vehicle, etc.), the stiffness of the suspension system (e.g., the stiffness of each air spring, the pressure at each air spring required to maintain the stiffness, etc.), whether the suspension system is in an active or inactive state (e.g., whether air is being actively compressed in the air suspension system), and any other suitable data related to the state of the vehicle suspension system. Block S120 can be performed by: the ECU, the fluid suspension system, pressure sensors within the pressure manifolds, the vehicle, or by any suitable system. In variations, Block S120 can be performed upon trigger event detection, periodically, asynchronously, and/or with any other suitable temporal characteristics. Trigger events can include: crossing of a virtual geofence (e.g., along a vehicle route), an output of a vehicle sensor exceeding a threshold value (or falling below a threshold value, or falling outside a predetermined range of values), receiving a user input, and any other suitable event.

Block S120 can include Block S121, which includes: sampling, at a manifold of the fluid suspension system of the vehicle during vehicle loading, a set of fluid pressures corresponding to a set of fluid springs of the fluid suspension system. Block S121 functions to directly measure the system pressure in the fluid springs (e.g., air springs, pneumatic actuators, hydraulic springs, actuators, etc.) supporting the vehicle load, and thereby determine the load (e.g., weight) supported by each spring and the total load weight in the cargo compartment of the vehicle. The fluid springs supporting the vehicle load can include: vehicle suspension springs, the tongue jack (e.g., controlling a mounting height of an RV or trailer to a tow vehicle), air springs, air jacks, landing gear extended or retracted by a fluid spring or jack, the air bladders (e.g., inner tubes) of vehicle tires, or be any suitable set of fluid springs.

Block S120 can include Block S122, which includes: determining a first load arrangement based on the set of fluid pressures, which functions to determine how the cargo (e.g., load, mass) is distributed within the trailer. In one variation, the first load arrangement includes a coordinate mapping between a first discrete portion of the vehicle load and a first location within a cargo compartment of the vehicle. Block S122 functions to compute the distribution of the load within the cargo compartment based on the fluid pressures at points distributed around the vehicle chassis (e.g., between the cargo compartment and the axles of the vehicle). In this variation, each fluid manifold and/or pressure sensor is mapped to a predetermined vehicle position (e.g., trailer position), wherein the mass for each trailer position can be calculated from the respective pressure sensor measurement. In a second variation, the first load arrangement is determined by recording a set of exterior images of the loaded vehicle. The relative suspension heights can be determined from the distance between the wheel and the wheel well (e.g., extracted from the image using segmentation, feature detection, or other computer vision techniques), the load's mass can be determined based on the change in suspension height, and the load distribution can be determined based on the relative heights of the suspension elements. However, the load arrangement can be otherwise determined.

Block S120 can include Block S123, which includes: determining an existing stiffness distribution, the existing stiffness distribution comprising a stiffness value associated with each of the set of fluid springs, based on the set of fluid pressures. Block S123 functions to compute the effect of the load within the cargo compartment in the form of the spring stiffness, which is an adjustable function of the controlled fluid pressure in each spring. Block S123 can be performed by sampling the pressure at each air spring (e.g., at a reservoir port of each air spring, at a pressure line coupled to each air spring, at a manifold coupled to each air spring, etc.), and correlating the sampled pressure to a spring stiffness (e.g., via a lookup table stored at a database). The stiffness value is preferably a spring constant (e.g., an adjustable spring constant) associated with the suspension element (e.g., the air spring); however, the stiffness value can include any related dynamic parameter governing suspension element operation (e.g., damper setting, dashpot resistance, intrinsic stiffness, etc.). The stiffness distribution is preferably correlated to the load distribution within the cargo compartment of the vehicle (e.g., the stiffness is correlated to the internal pressure of the fluid spring, which is correlated to the load distribution); however, in variations, the stiffness distribution can be independent of the load distribution and can be independently set (e.g., via the controllable manifold). However, Block S123 can be otherwise suitably performed.

Block S130 includes: determining a desired state of the vehicle suspension system, which functions to identify the state of the vehicle suspension system required to achieve a criterion or criteria that are based on the vehicle condition parameter. The desired state of the vehicle suspension system can be defined as above in relation to the existing state of the vehicle suspension system, and in any other suitable manner. The desired state is preferably determined based on the vehicle condition parameter (e.g., as described above), but can additionally or alternatively be determined based on the set of loading criteria, a contextual dataset, and/or any other suitable basis. The desired state is preferably determined by the ECU, but can additionally or alternatively be determined by any suitable computing system and/or user associated with the vehicle. In some variations, the desired state of the vehicle suspension system is identical to the existing state of the vehicle suspension system (e.g., the existing and desired load arrangements are the same, the existing and desired stiffness distributions are the same, etc.); in such cases, transforming the existing state of the vehicle suspension system into the desired state of the vehicle suspension system can include passively maintaining the vehicle suspension system in the existing state, or otherwise providing for the suspension state to be maintained (e.g., providing loading instructions to the user that include retaining the existing configuration, arrangement, and/or distribution of the load, etc.).

Block S130 can include Block S131, which includes: determining a second load arrangement based on the set of loading criteria. The second load arrangement can include a second coordinate mapping between a second discrete portion of the vehicle load and a second location within the cargo compartment of the vehicle. Block S131 functions to identify an arrangement for the load within the vehicle that satisfies the set of loading criteria. For example, in cases wherein the set of loading criteria includes a maximum weight borne by each axle, Block S131 can include determining an arrangement of the load (which can be different from or identical to the first arrangement) that results in a load distribution that does not exceed the maximum weight borne by each axle. However, Block S131 can additionally or alternatively include determining the second load arrangement based on the set of loading criteria in any other suitable manner.

A variation of Block S131 includes calculating the second load arrangement using the dynamical model (e.g., determined in Block S111). In this variation, the first load location (e.g., determined in Block S122) is an input to the dynamical model.

In a specific example of Blocks S121 and S131, determining the second load arrangement includes determining a new location for the first discrete portion of the vehicle load (e.g., rearranging the first discrete portion of the vehicle load, the first discrete portion of the vehicle load and the second discrete portion are the same portion of the vehicle load, etc.)

Block S130 can include Block S132, which includes: determining a desired stiffness distribution. Block S132 functions to determine a stiffness value associated with each suspension element (e.g., air spring) that corresponds to the desired state of the suspension system. Block S132 can be performed based on the contextual dataset, the set of loading criteria, any other vehicle condition parameter, and any other suitable basis. The desired stiffness distribution is preferably the set of stiffness values thus determined, but can additionally or alternatively be a set of pressures (e.g., which correspond to stiffness values of the air springs thus pressurized), a range of stiffness values associated with each suspension element with any suitable correspondence (e.g., one to one, one to many, etc.), and otherwise suitably defined. The desired stiffness distribution is preferably determined by the ECU as a component of determining the desired state of the vehicle suspension system, but can be otherwise suitably determined. The desired stiffness distribution can be determined in order to affect (e.g., maintain, achieve, etc.) a related parameter of the suspension system; for example, the desired stiffness distribution can be determined (e.g., chosen, computed) to maintain the height and/or flatness of the vehicle during loading (e.g., by raising and/or stiffening springs supporting heavier portions of the load relative to other springs to prevent sagging). Block S132 is preferably performed in substantially real time during vehicle operation (e.g., loading, driving, etc.), but can additionally or alternatively be performed periodically (e.g., every minute, every 15 seconds, etc.), asynchronously, based on a trigger event (e.g., an additional portion of the load being added to the cargo compartment), or with any other suitable temporal characteristics.

Block S140 includes: transforming the existing state of the vehicle suspension system into the desired state of the vehicle suspension system, which functions to realize the desired vehicle load distribution and/or arrangement. Block S140 is preferably performed immediately subsequent and in response to Block S130, but can additionally or alternatively be performed at any other suitable time in response to any other suitable event (e.g., a trigger event, a user input, etc.).

Block S140 can include Block S141, which includes: determining a loading instruction set. Block S141 functions to generate a set of instructions that describe how to modify the load to achieve the desired state of the suspension system (e.g., corresponding to a desired load distribution, a desired stiffness distribution, etc.). In one variation, Block S141 can be based on the desired load arrangement. For example, the loading instruction set can include a set of verbal instructions guiding the user towards rearranging the vehicle load in order to achieve the desired load arrangement. Block S141 is preferably performed at the ECU, but can additionally or alternatively be performed using any other suitable computing system.

Block S140 can include Block S142, which includes: providing the loading instruction set to a user of the vehicle. Block S142 functions to provide the instruction set determined in Block S141 to the user, so that the user can take action according to the instruction set to achieve the desired state of the suspension system.

In an example implementation, Blocks S141 and S142 can include generating the instruction set at the ECU, and transmitting the instruction set to a mobile device of the user. In another example, Blocks S141 and S142 can include receiving pressure measurements from the ECU at a processing system (e.g., a mobile device, a vehicle computing system, a remote computing system), generating the instruction set at the processing system, and transmitting the instruction set to the user (e.g., at a display or interface of the processing system, at a mobile device associated with the user, etc.). However, Blocks S141 and S142 can be otherwise suitably performed.

Block S140 can include Block S143, which includes: automatically controlling the set of fluid springs at the plurality of actuation points based on the desired stiffness distribution, wherein controlling the set of fluid springs can include setting the stiffness value of the fluid spring associated with each of the plurality of actuation points. The actuation points are preferably the physical locations on the vehicle at which the fluid suspension elements (e.g., fluid springs) apply force to the axles and chassis of the vehicle to provide suspension of the vehicle, but can be otherwise suitably defined. Block S143 functions to directly adjust the pressure at the fluid springs (e.g., each fluid spring individually) to control the height and/or stiffness of the suspension system at each actuation point. Block S143 can be performed concurrently (e.g., simultaneously, contemporaneously, etc.) with measurement of the existing state of the suspension system and/or with loading and unloading of the vehicle, at high frequency (e.g., once per 500 ms), at low frequency (e.g., once per minute), at an adjustable periodic frequency or with any other suitable temporal characteristic. In another variation, Block S143 can be performed, a user instruction can be received, and Block S143 can be performed again based on the user instruction. Block S143 is preferably performed by the ECU, but can additionally or alternatively be performed by any other suitable computing system (e.g., a native application executing at a mobile device of the user). In a specific example, Block S143 can include compressing the fluid, pumping the compressed fluid along a pressurized fluid line into a fluid spring, and thus increasing the pressure in the fluid spring and thereby increasing the stiffness of the fluid spring. In this specific example, Block S143 can include achieving a set pressure point via a closed loop control mechanism (e.g., wherein the measured pressure in the fluid spring is the input to the control loop).

In a specific example, Block S143 includes: actuating the set of fluid springs in response to placement of at least one of the first load portion and the second load portion within the cargo compartment, wherein actuating the set of fluid springs minimizes an angular difference between a vector normal to a base of the cargo compartment and a gravity vector (e.g., levels the cargo compartment).

In another specific example, Block S143 includes: automatically controlling the set of fluid springs in response to an anticipated terrain feature (e.g., determined in Block S112) along the vehicle route. In this example, Block S143 can include setting a first stiffness value of a first subset of the plurality of actuation points at a first side of the vehicle, and setting a second stiffness value of a second subset of the plurality of actuation point at a second side of the vehicle opposing the first side (e.g., in anticipation of terrain feature including a banked turn).

The method can include Block S150, which includes: generating feedback for the user during loading. Block S150 functions to inform an entity loading the vehicle (e.g., the user) of the instantaneous status of the vehicle load distribution, such that the entity can act to load the vehicle according to the desired load distribution in real-time (e.g., substantially real time). The feedback is preferably generated based on the output of Block S120 and/or S130 (e.g., a state of the suspension system and the correlated arrangement of the load within the vehicle), but can additionally or alternatively be based on vehicle condition parameters, a loading instruction set (e.g., determined in Block S141), and/or any other suitable basis. The feedback is preferably generated by the ECU, but can additionally or alternatively be generated by any other suitable computing system. The feedback is preferably displayed to the user (e.g., at a graphical user interface) in real- or near-real time during vehicle operation (e.g., loading). For example, Block S150 can include displaying a graphical representation of the vehicle and the load distribution within the vehicle, and highlighting portions of the vehicle where the load does not satisfy a set of loading criteria (e.g., exceeds a maximum weight corresponding to the axle bearing the load located at the highlighted portion). However, Block S150 can additionally or alternatively include generating feedback in any other suitable manner.

Figure 6A:
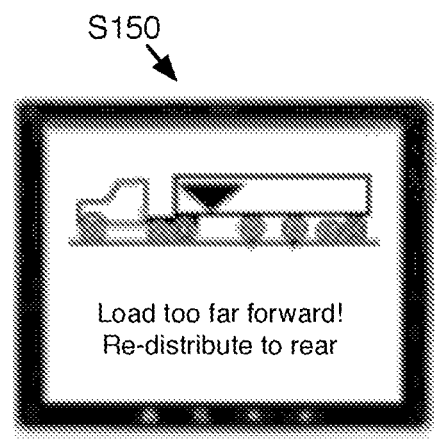
FIGS. 6A-B depict example renderings in accordance with a portion of an example of the method.
Figure 6B:
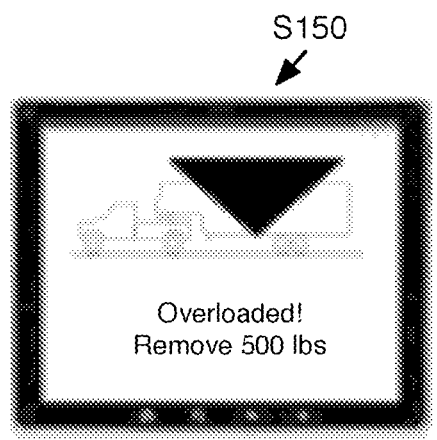

In one variation, Block S150 includes: providing a notification to a user of the vehicle. The notification can include any suitable information related to the vehicle loading, including: a fraction of the vehicle load supported by each of the fluid springs of the set of fluid springs, an indication that the load is improperly arranged and instructions for remediation (e.g., as shown in FIG. 6A), a warning that the vehicle is overloaded (e.g., as shown in FIG. 6B), and any other suitable load-related data or information. In a related variation, Block S150 further includes: graphically rendering the notification at a device associated with the user; receiving input from the user at the device; and actuating the set of fluid springs based on the input. Block S150 can additionally or alternatively include receiving input from the user at an interface (e.g., an override switch, a dashboard console, etc.) and actuating the suspension system (or ceasing actuation) in response to the input at the interface.

In another variation, Block S150 includes: monitoring, in substantially real-time, the set of pressure values during vehicle loading, determining a real-time load arrangement, and generating a comparison between the real-time load arrangement and the second load arrangement. In this variation, Block S150 further includes providing a notification to the user based on the comparison. In an example, the notification indicates a degree of user compliance with the loading instruction set. In another example, Block S150 can include providing an overload alert (e.g., via a dashboard indicator) when a load is detected that exceeds the maximum load supportable by the primary suspension and/or the primary suspension in combination with the lift axle(s).

The method can include Block S160, which includes: automatically deploying, using the fluid suspension system, a lift axle (e.g., drop axle) based on the satisfaction of a deployment criterion. Block S160 functions to increase the number of axles bearing the vehicle load and/or increase the load borne by the lift axle(s). The deployment criterion can include any condition that indicates additional load-bearing axles are desirable, such as: the total load weight exceeding a threshold value, a permitted number of axles corresponding to the geographic location of the vehicle exceeding the existing number of deployed axles, and any other suitable condition. In a specific example, Block S160 includes increasing the fluid pressure (e.g., using the ECU-controlled manifold) in one or more fluid-driven jacks that drive the lift axle away from the vehicle undercarriage and into contact with the ground, and continuing to increase the fluid pressure until the lift axle is bearing the desirable fraction of the vehicle load weight (e.g., based on the measured pressure of the fluid-driven jacks in combination with the measured pressure of other suspension elements). In another specific example, Block S160 includes using a first fluid-driven suspension element (or set of such elements) to deploy the axle (e.g., move the axle into from contact with the ground), and a second fluid-driven suspension element (or set of such elements) to adjust the load borne by the lift axle(s) (e.g., increase the fluid pressure until the axle is bearing the desirable fraction of the vehicle load weight).

In a variation of Block S160, the deployment criterion includes the desired stiffness distribution including a stiffness value exceeding a threshold stiffness value (e.g., corresponding to one of the fluid springs).

The method can include Block S170, which includes: automatically retracting, using the fluid suspension system, a lift axle (e.g., drop axle) based on the satisfaction of a retraction criterion. Block S170 functions to decrease the number of load bearing axles and/or reduce the load borne by the lift axle(s). The retraction criterion can include any condition that indicates fewer load-bearing axles are desirable, such as: the total load weight is beneath a threshold value, the existing number of deployed axles exceeding a permitted number of axles corresponding to the geographic location of the vehicle, additional fuel economy is desirable and additional load bearing is not required, weather conditions indicate increased traction (e.g., at the drive axle) is desirable, and any other suitable condition. In a specific example, Block S160 includes decreasing the fluid pressure (e.g., using the ECU-controlled manifold) in one or more fluid-driven jacks that drive the lift axle away from contact with the ground and toward the vehicle undercarriage, and continuing to decrease the fluid pressure until the lift axle is bearing the desirable fraction of the vehicle load weight (e.g., based on the measured pressure of the fluid-driven jacks in combination with the measured pressure of other suspension elements). In another specific example, Block S170 includes using a first fluid-driven suspension element (or set of such elements) to retract the axle (e.g., move the axle away from contact with the ground), and a second fluid-driven suspension element (or set of such elements) to adjust the load borne by the lift axle(s) (e.g., decrease the fluid pressure until the axle is bearing the desirable fraction of the vehicle load weight).

In a variation of Block S170, the retraction criterion comprises a planned route of the vehicle including a turn exceeding a threshold turn angle. In this variation, automatically retracting the drop axle is performed within a time period proximal to and preceding a time point at which the turn is made by the vehicle.

Figure 7:
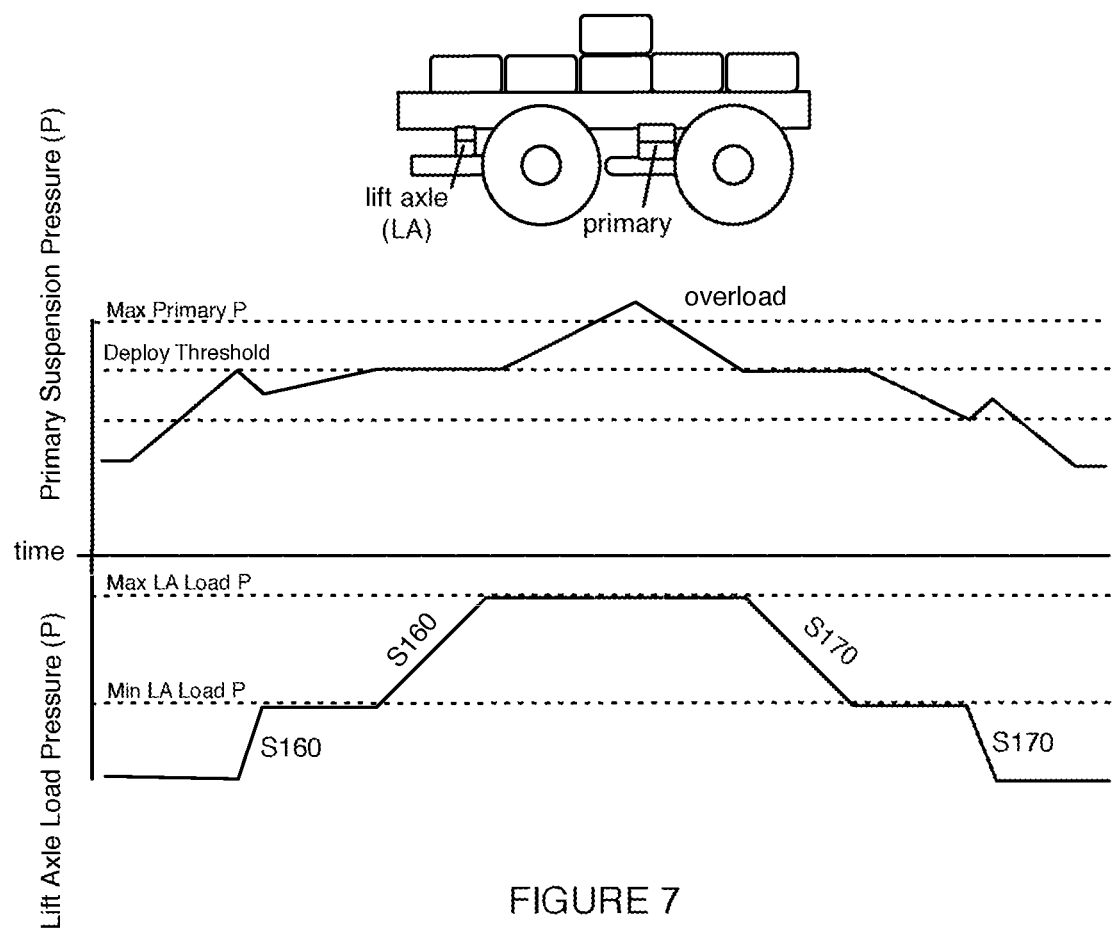
FIG. 7 depicts an example time series of suspension pressures in accordance with an example implementation of a variant of the method.

Blocks S160 and S170 can be performed synchronously (e.g., alternating increasing and decreasing the pressure at the lift axle) to maintain a desired difference in load between the primary suspension (e.g., suspension of the non-liftable axles, the drive axles, etc.) and the secondary suspension (e.g., the suspension of the deployable/retractable axle). As shown in FIG. 7, the pressure at the lift axle suspension element (e.g., air spring) can be adjusted as a function of time, which can in turn be correlated with dynamic loading/unloading of the vehicle (i.e., the load can vary as a function of time). As also shown in FIG. 7, Blocks S160 and S170 can be based on the primary suspension load exceeding a threshold pressure (e.g., deployment threshold) and/or falling below the threshold pressure.

Blocks S160 and S170 can be implemented to provide single lift axle control, multiple lift axle control, and/or primary suspension height control in combination with the lift axle control.

The method can include Block S180, which includes: automatically adjusting a fluid pressure in at least one tire of the vehicle, using the fluid suspension system, based on the contextual data. In examples, Block S180 can include managing tire pressures substantially as described in U.S. application Ser. No. 15/805,015, filed 6 Nov. 2017, and incorporated herein in its entirety by this reference. However, Block S180 can include otherwise suitably controlling the pressure (s) in one or more tires of the vehicle.

5. Specific Implementations

Figure 8:
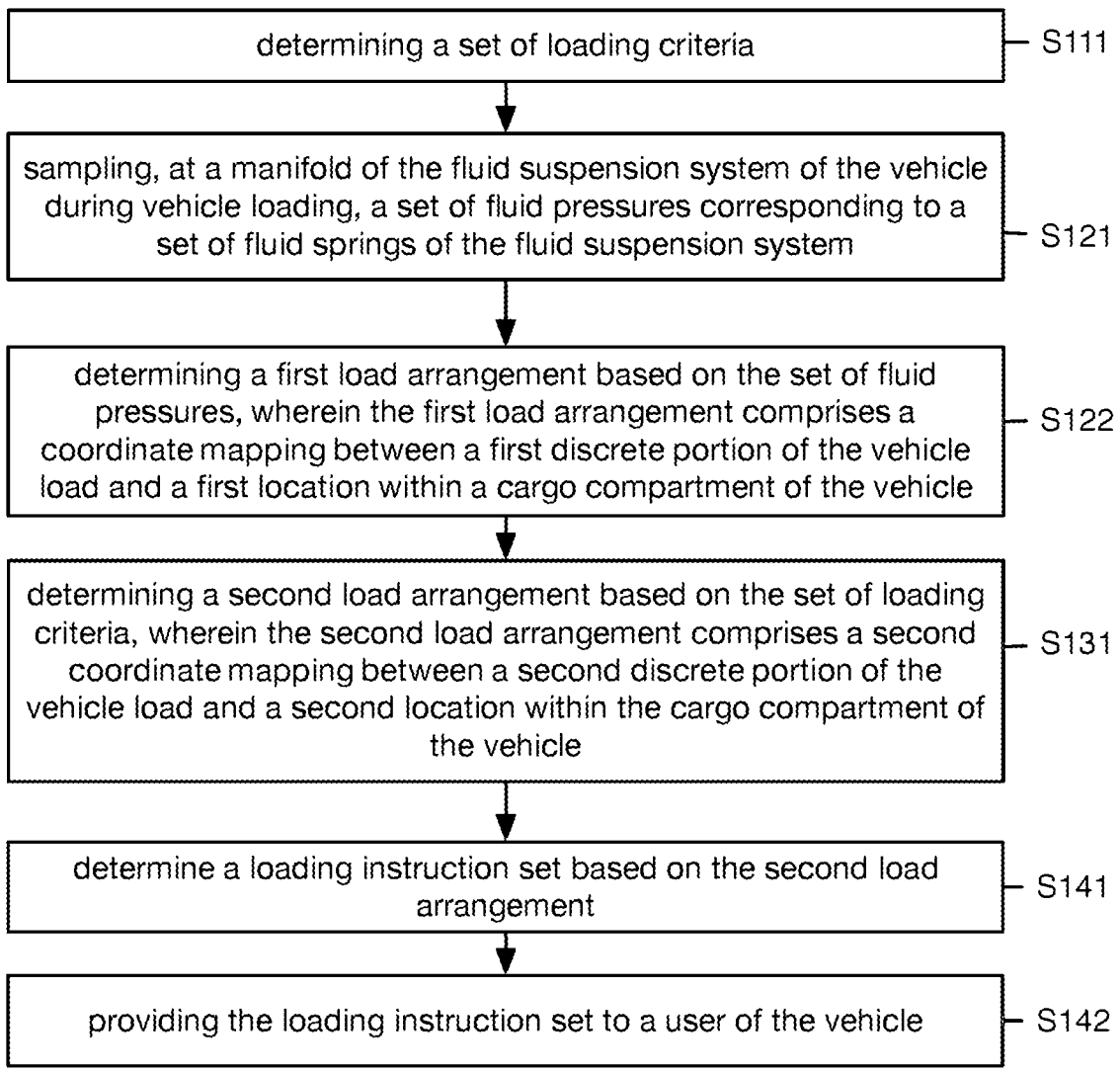
FIG. 8 is a flowchart depiction of a specific example implementation of the method.

A first specific implementation of the method 100, as shown in FIG. 8, includes: determining a set of loading criteria S111; sampling, at a manifold of the fluid suspension system of the vehicle during vehicle loading, a set of fluid pressures corresponding to a set of fluid springs of the fluid suspension system S121; determining a first load arrangement based on the set of fluid pressures, wherein the first load arrangement comprises a coordinate mapping between a first discrete portion of the vehicle load and a first location within a cargo compartment of the vehicle S122; determining a second load arrangement based on the set of loading criteria, wherein the second load arrangement comprises a second coordinate mapping between a second discrete portion of the vehicle load and a second location within the cargo compartment of the vehicle S131; determining a loading instruction set based on the second load arrangement S141; and providing the loading instruction set to a user of the vehicle S142.

Figure 9:
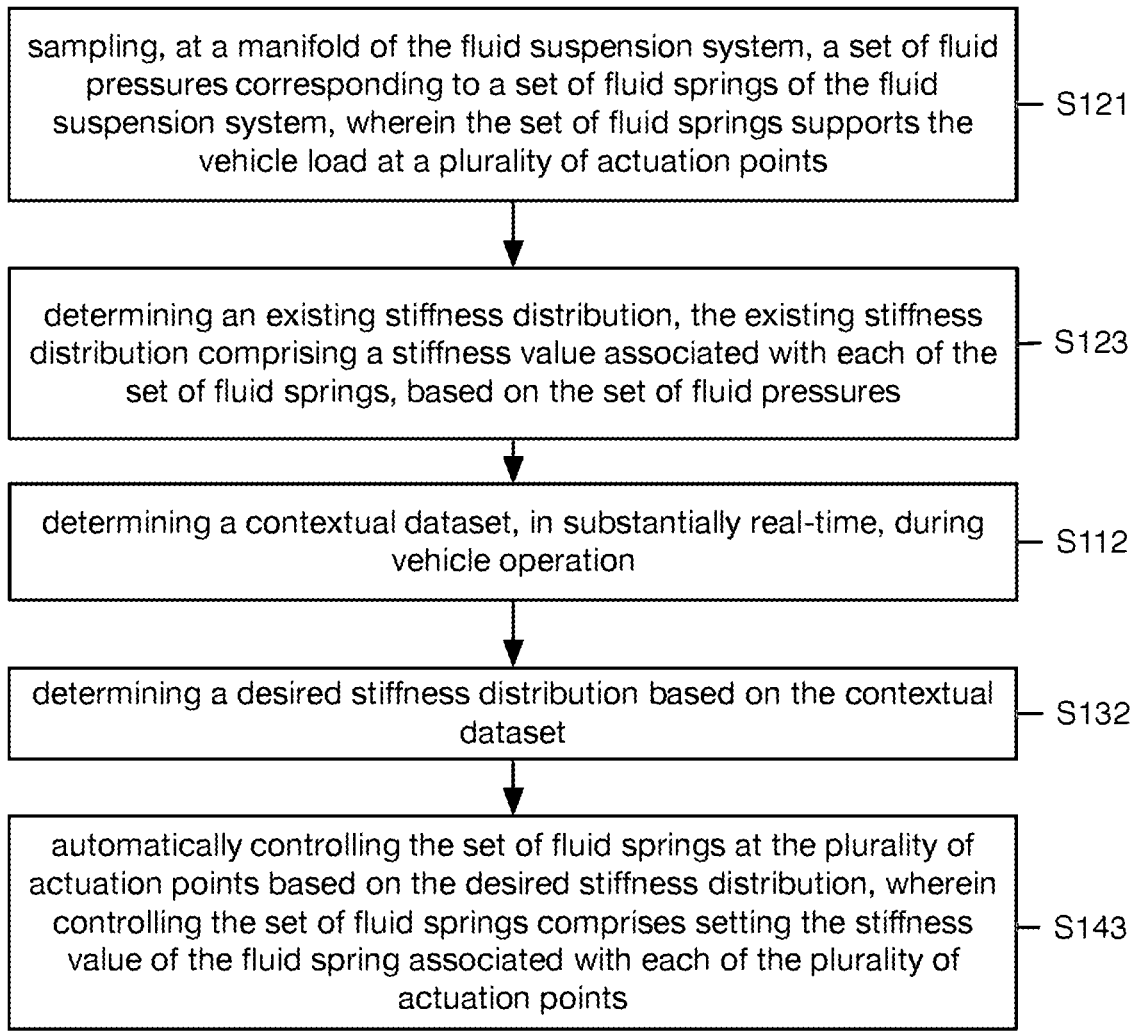
FIG. 9 is a flowchart depiction of a specific example implementation of the method.

A second specific implementation of the method 100, as shown in FIG. 9, includes: sampling, at a manifold of the fluid suspension system, a set of fluid pressures corresponding to a set of fluid springs of the fluid suspension system, wherein the set of fluid springs supports the vehicle load at a plurality of actuation points S121; determining an existing stiffness distribution, the existing stiffness distribution comprising a stiffness value associated with each of the set of fluid springs, based on the set of fluid pressures S123; determining a contextual dataset, in substantially real-time, during vehicle operation S112; determining a desired stiffness distribution based on the contextual dataset S132; and automatically controlling the set of fluid springs at the plurality of actuation points based on the desired stiffness distribution, wherein controlling the set of fluid springs comprises setting the stiffness value of the fluid spring associated with each of the plurality of actuation points S143.

An alternative embodiment preferably implements the above methods in a computer-readable medium storing computer-readable instructions. The instructions are preferably executed by computer-executable components preferably integrated with a fluid suspension control unit. The fluid suspension control unit may include a pressure control system, a manifold, and any other suitable components. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for analyzing and managing a vehicle load carried by a vehicle, the vehicle having a fluid suspension system, the method comprising:

sampling, at a manifold of the fluid suspension system, a set of fluid pressures corresponding to a set of fluid springs of the fluid suspension system, wherein the set of fluid springs supports the vehicle load at a plurality of actuation points;

determining an existing stiffness distribution, the existing stiffness distribution comprising a stiffness value associated with each of the set of fluid springs, based on the set of fluid pressures;

determining a contextual dataset, in substantially real-time, during vehicle operation;

determining a desired stiffness distribution based on the contextual dataset;

automatically controlling the set of fluid springs at the plurality of actuation points based on the desired stiffness distribution, wherein controlling the set of fluid springs comprises setting the stiffness value of the fluid spring associated with each of the plurality of actuation points, and wherein the contextual dataset comprises an anticipated terrain feature, and wherein determining the contextual dataset is based on a planned route of the vehicle and terrain features associated with the planned route.

2. The method of claim 1, wherein the anticipated terrain feature comprises a banked roadway, and wherein automatically controlling the set of fluid springs comprises setting a first stiffness value of a first subset of the plurality of actuation points at a first side of the vehicle, and setting a second stiffness value of a second subset of the plurality of actuation point at a second side of the vehicle opposing the first side.

3. The method of claim 1, further comprising automatically adjusting a fluid pressure in at least one tire of the vehicle, using the fluid suspension system, based on the contextual data.

4. The method of claim 3, wherein the contextual data comprises a total weight of the vehicle load.

5. A method for analyzing and managing a vehicle load carried by a vehicle, the vehicle having a fluid suspension system, the method comprising:

sampling, at a manifold of the fluid suspension system, a set of fluid pressures corresponding to a set of fluid springs of the fluid suspension system, wherein the set of fluid springs supports the vehicle load at a plurality of actuation points;

determining an existing stiffness distribution, the existing stiffness distribution comprising a stiffness value associated with each of the set of fluid springs, based on the set of fluid pressures;

determining a contextual dataset, in substantially real-time, during vehicle operation;

determining a desired stiffness distribution based on the contextual dataset; and automatically controlling the set of fluid springs at the plurality of actuation points based on the desired stiffness distribution, wherein controlling the set of fluid springs comprises setting the stiffness value of the fluid spring associated with each of the plurality of actuation points, wherein the contextual dataset comprises an indication that the vehicle is being loaded, and wherein automatically controlling the set of fluid springs comprises maintaining a base surface of a cargo compartment of the vehicle substantially perpendicular to a gravity vector during loading, wherein the vehicle load comprises discrete load portions.

6. A method for analyzing and managing a vehicle load carried by a vehicle, the vehicle having a fluid suspension system, the method comprising:

sampling, at a manifold of the fluid suspension system, a set of fluid pressures corresponding to a set of fluid springs of the fluid suspension system, wherein the set of fluid springs supports the vehicle load at a plurality of actuation points;

determining an existing stiffness distribution, the existing stiffness distribution comprising a stiffness value associated with each of the set of fluid springs, based on the set of fluid pressures;

determining a contextual dataset, in substantially real-time, during vehicle operation;

determining a desired stiffness distribution based on the contextual dataset;

automatically controlling the set of fluid springs at the plurality of actuation points based on the desired stiffness distribution, wherein controlling the set of fluid springs comprises setting the stiffness value of the fluid spring associated with each of the plurality of actuation points; and automatically changing a position of a lift axle using the fluid suspension system, including at least one of: automatically deploying the lift axle based on the satisfaction of a deployment criterion, or automatically retracting the lift axle based on the satisfaction of a retraction criterion.

7. The method of claim 6, wherein the deployment criterion comprises the desired stiffness distribution including a stiffness value exceeding a threshold stiffness value at a fluid spring of the set of fluid springs.

8. The method of claim 6, wherein the deployment criterion comprises a planned route of the vehicle including vehicle travel in a geographic region associated with a regulatory rule set, the regulatory rule set including a weight-per-axle limit.

9. The method of claim 6, wherein the automatically changing the position of the lift axle using the fluid suspension system includes automatically retracting the lift axle based on the satisfaction of the retraction criterion.

10. The method of claim 9, wherein the retraction criterion comprises a planned route of the vehicle including a turn exceeding a threshold turn angle, and wherein automatically retracting the lift axle is performed within a time period proximal to and preceding a time point at which the turn is made by the vehicle.

* * * * *